United States Patent [19]

Bruch et al.

[11] 3,739,282

[45] June 12, 1973

[54] RADIO RECEIVER FOR SINGLE SIDEBAND RECEPTION

[75] Inventors: Walter Bruch, Werner Scholz, both of Hannover, Germany

[73] Assignee: Licentia Patent-Verwaltungs-G.M.b.H., Frankfurt am Main, Germany

[22] Filed: Dec. 10, 1970

[21] Appl. No.: 96,901

[30] Foreign Application Priority Data

Dec. 11, 1969 Germany .................. P 19 62 156.8

[52] U.S. Cl. ............... 325/330, 325/419, 325/420, 329/50

[51] Int. Cl. ............................................ H04b 1/68

[58] Field of Search .........331/172–174; 325/50, 325/330, 419, 420; 329/50, 122; 179/15 FS; 332/45

[56] References Cited

UNITED STATES PATENTS

| | | | |
|---|---|---|---|
| 3,084,328 | 4/1963 | Groeneveld et al. | 325/45 |
| 3,562,670 | 2/1971 | Uchida | 331/173 |
| 3,217,258 | 11/1965 | Arlin et al. | 329/50 |
| 3,355,550 | 11/1967 | Lemiere et al. | 331/172 |
| 3,345,579 | 6/1966 | Wilkinson | 331/172 |
| 3,381,533 | 5/1968 | Behrens | 331/174 |

*Primary Examiner*—Albert J. Mayer
*Attorney*—Spencer & Kaye

[57] ABSTRACT

In a single sideband radio receiver for the selective reception of signals transmitted by a plurality of transmitters at equal frequency spacing ($\Delta f_s$) the local oscillator in the receiver, which may produce voltages for either heterodyning or demodulating the received signal, is controlled by means of an arrangement including an ultrasonic delay line which serves as the frequency standard for the spacing of the local oscillator frequencies ($\Delta f_o$) so that it locks in and oscillates only at defined oscillator frequencies corresponding to the frequencies of the transmitters. Various alternative embodiments of controlling the local oscillator in this manner are disclosed.

11 Claims, 8 Drawing Figures

Inventors.
Walter Bruch
Werner Scholz
BY Spencer & Kaye
ATTORNEYS.

Inventors.
Walter Bruch
Werner Scholz

BY Spencer & Kaye
ATTORNEYS.

RADIO RECEIVER FOR SINGLE SIDEBAND RECEPTION

BACKGROUND OF THE INVENTION

The present invention relates to a radio receiver for single sideband reception, and particularly a circuit for producing an accurate frequency pattern for an oscillator serving for heterodyning or demodulating the received signal.

In radio receivers for single sideband reception, it is known (Rundfunktechnische Mitteilungen 1969, No. 2, pages 53–57) to employ a quartz oscillator, a frequency divider and a pulse stage to produce a carrier frequency spectrum which has spectral lines for the individual transmitting frequencies which serve as additional carriers in order to provide for the distortion free demodulation of the single sideband signals. In such receivers, the selectivity of the transmitter frequency is realized before the demodulator by a known selective tuning circuit. Thus signals must be produced in the receiver which have frequencies associated with the transmitting frequencies.

It is also known (Rundfunktechnische Mitteilungen, 1967, No. 6, pages 304–313) to convert the received single sideband signal in a mixer stage to an IF signal of constant frequency by utilizing a heterodyning oscillator which is so controlled by a pulse train having a frequency equal to the frequency spacing of the transmitter that it locks in only at the frequencies assigned to the transmitter frequencies.

Thus, in both cases, a local oscillator is required in the receiver which only oscillates at certain frequencies which are assigned as transmitting frequencies and which lie at the frequency spacing of the transmitters to be received. The frequency standard for this frequency spacing is determined, for example, by a quartz filter or by two of these received transmitters. These circuits are relatively complicated because they require frequency divider or control circuits.

SUMMARY OF THE INVENTION

It is the object of the present invention to simplify the circuit for producing the accurate frequency pattern of the local oscillator in the receiver and to realize high accuracy of the frequency spacing of the generated oscillator frequencies.

This is accomplished according to the present invention in that the local oscillator in the single sideband receiver, which oscillator may produce signals utilized either for heterodyning or demodulating the received signals, is controlled by means of a circuit, including an ultrasonic delay line which serves as the frequency standard for the spacing of the oscillator frequencies ($\Delta f_o$), so that the oscillator locks in and oscillates only at the frequencies associated with the frequencies ($f_s$) of each of the transmitters which are equally spaced at a spacing $\Delta f_s$.

A number of different embodiments for controlling the local oscillator in this manner are disclosed. For example, according to a number of embodiments, the delay line forms the frequency determining member of a pulse train generator whose output pulses either directly or indirectly, e.g., by means of a phase comparator output signal, controls the frequency of the local oscillator.

According to other embodiments of the invention, the desired control of the oscillator is achieved by connecting the delay line in the feedback path of the oscillator, or between the output and a synchronizing input of the oscillator.

According to still a further embodiment of the invention, the input of the delay line is connected to the output of the local oscillator a control signal for the oscillator is generated in a phase comparator which compares the phase of the input and output signals from the delay line.

The present invention is based on the realization that ultrasonic delay lines which are known for other purposes can be used with particular advantage in the above-mentioned single sideband receiver. Such a delay line constitutes not only a relatively small component which is not subject to malfunction, but additionally, since such delay lines are currently being manufactured in large numbers for color television receivers, the price is also tenable. Moreover, such a delay line represents a particularly accurate frequency standard because its delay time is extraordinarily stable, can be set very accurately and is practically independent of temperature fluctuations. For example, a so-called PAL delay line i.e., the ultrasonic delay line commonly used in PAL type color television receiver can be used since its delay time is adapted to the respective frequency spacing. The delay time of a PAL delay line lies in the order of magnitude of the reciprocal value of the transmitter frequency spacing in the medium frequency range. The pass frequency of such a PAL line also lies in the order of magnitude of the transmitter frequencies used for single sideband reception. The present invention thus opens a new field of application for the known ultrasonic delay line.

DESCRIPTION OF THE PREFERRED EMBODIMENTS

Figure 1:
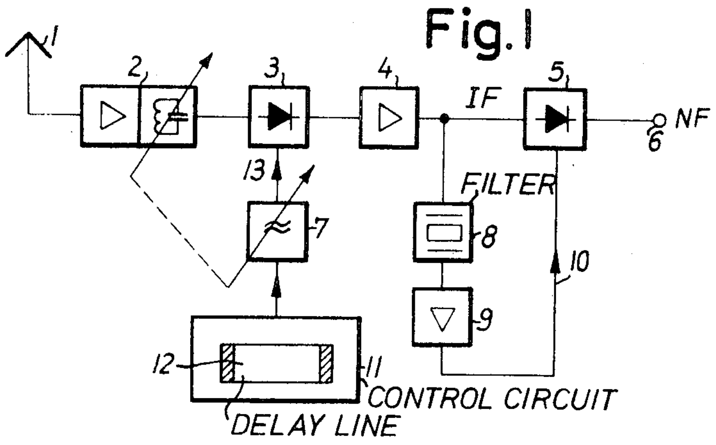
FIG. 1 is a basic circuit diagram of a selective single sideband receiver constructed according to the present invention.

Referring now to FIG. 1, there is shown a single sideband receiver wherein, in a conventional manner, a high frequency signal modulated in the single sideband is received by an antenna 1, amplified in a selective tunable amplifier 2 and fed to a mixer or detector stage 3 whose output voltage is fed via an IF amplifier 4, to a demodulator or detector 5 which furnishes a low frequency signal (NF), e.g., an audio signal, at an output terminal 6. The mixer stage 3 is controlled by a controllable heterodyning oscillator 7 (local oscillator) in a well-known manner so that the amplifier 4 receives an intermediate frequency (IF) of constant frequency. At the output of amplifier 4 the carrier frequency is filtered out of the IF signal by means of a narrow band filter 8, which may, e.g., be a quartz filter, a ceramic filter or a multistage filter with concentrated components, as a singular frequency and is fed to demodulator 5 via amplifier 9 and line 10 to be demodulated without distortion.

As illustrated in FIG. *2a*, the antenna receives signals from a plurality of transmitters which signals are at a frequency spacing of $\Delta f_s$ (e.g., 9 kHz) at frequencies $f_{s1}$, $f_{s2}$ . . . The oscillator 7 is tuned to the individual transmitters in synchronism with amplifier 2 so that it produces the oscillator frequency $f_{o1}$ for transmitter frequency $f_{s1}$, which frequency $f_{01}$ is shifted by the intermediate frequency (e.g., 460 kHz) with respect to $f_{s1}$. According to the present invention, the oscillator 7 is controlled by a circuit 11 containing an ultrasonic delay line 12 in such a manner that it oscillates only at the oscillator frequencies $f_o$ assigned to the transmitter frequencies $f_s$, i.e., oscillator 7 locks in only at these assigned frequencies and does not oscillate between these frequencies. This high accuracy of the oscillator frequency is necessary because the frequency of the carrier must be particularly accurate in the intermediate frequency path so that it falls in the very narrow passing range of the bandpass filter 8. To accurately produce the desired frequency pattern of the oscillator frequencies (FIG. 2*b*) the delay line 12 is provided. The delay time of delay line 12 is selected to be equal to, for example, the reciprocal value of the frequency spacing $\Delta f_s$ and thus determines the spacing $\Delta f_o$ of the oscillator frequencies $f_o$. It is to be understood that although in FIG. 1 the oscillator 7 is a heterodyning oscillator (local oscillator), the invention is equally applicable to use with a local oscillator which provides carrier frequency oscillations and whose output is fed to demodulator 5 over line 10, which is formed in FIG. 1 by members 8, 9, if no conversion to the intermediate frequency occurs before the demodulation and demodulator 5 directly receives the different transmitter frequencies. Additionally, if required, the delay time $\tau$ and thus the frequency spacing $\Delta f_o$ may be varied, or made adjustable, by an additional delay line in series with delay line 12, which additional line may be adjustable.

With the aid of several alternative circuit embodiments of the invention, it will now be explained how the oscillator 7 is controlled by means of the delay line 12 so that it oscillates only at the frequencies $f_o$ which lie at spacings $\Delta f_o$.

Figure 2:
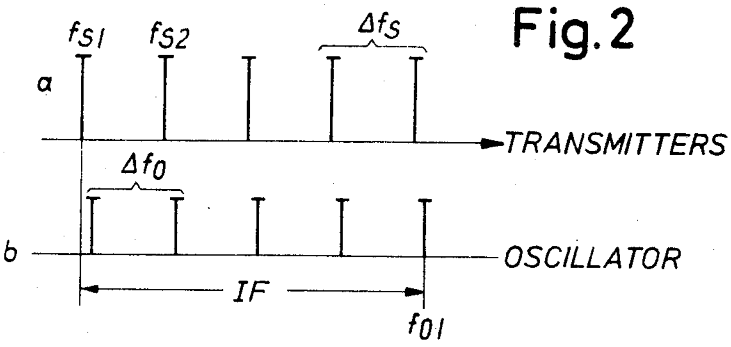
FIG. 2 illustrates the frequency spectrum of the received and local oscillator signals for explaining FIG. 1.
Figure 3:
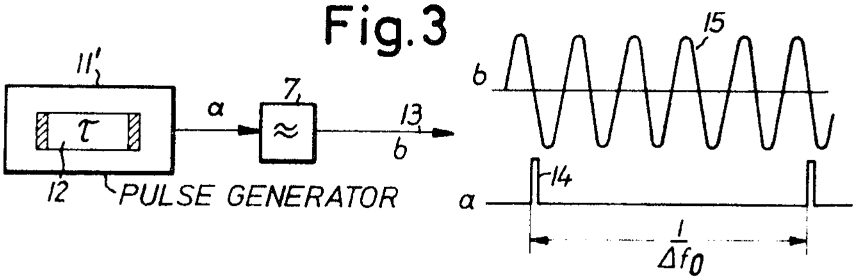
FIGS. 3–8 show various alternative circuit embodiments for controlling the receiver local oscillator using a delay line according to the invention.

As shown in FIG. 3, the control circuit 11 comprises a control generator 11' which generates pulses 14 at frequency $\Delta f_o$. The delay line 12 which determines the frequency of the pulses 14 is provided with a delay time $\tau$ equal to $1/\Delta f_o$. With the oscillator 7 oscillating at one of frequencies $f_o$, pulses 14 control oscillator 7 with a direct locking action so that the oscillator oscillation 15 exhibits, for example, a zero passage at each pulse 14. Between two pulses 14 there is thus always a whole number of oscillator oscillations 15. This means that the frequency of oscillations 15 is always a whole number multiple of frequency $\Delta f_o$ which in turn means then that oscillator 7 can oscillate only at whole number multiples of $\Delta f_o$. Thus a frequency spectrum according to FIG. 2*b* results when the oscillator is turned over its full range.

Figure 4:
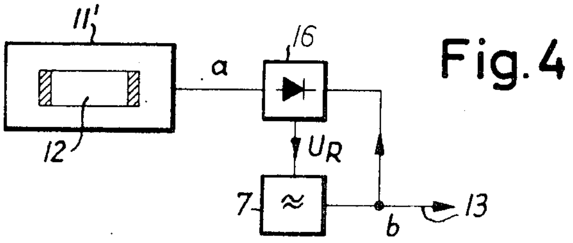

According to the embodiment of FIG. 4 the synchronization of the oscillator 7 by means of the output pulses 14 of generator 11' does not occur with a direct locking action as in FIG. 3 but rather via a control signal $U_R$ generated by a phase comparison stage 16. As illustrated, stage 16 compares the phase position of a pulse 14 with the oblique edge of the sine voltage output 15 of oscillator 7 during zero passage and furnishes the control voltage $U_R$ proportional to the difference. This control voltage $U_R$ is fed to the oscillator 7 to control the oscillator frequency or phase, in a well-known manner, so that the zero passages of oscillation 15 always coincide with pulses 14, whereby the above-mentioned requirement for the frequency spectrum of the output oscillations of oscillator 7 is also met.

Figure 5:
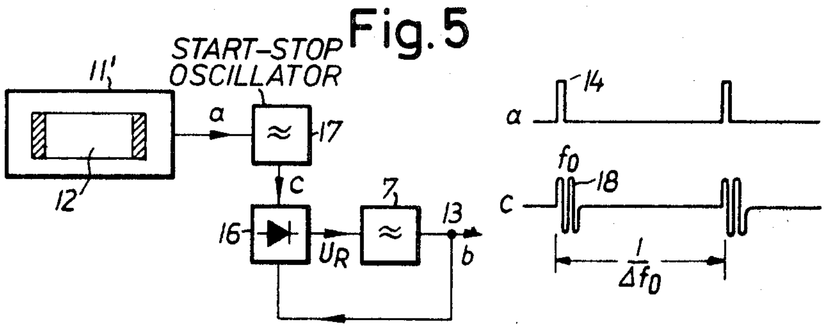

In the embodiment of the invention shown in FIG. 5, the output pulses 14 of control circuit 11 control a start stop oscillator 17 which generates several oscillations 18 at one of the oscillator frequencies $f_o$, e.g., at a frequency $f_o$ in the center of the total frequency band covered by oscillator 7, in response to each pulse 14. Since these oscillations 18 are interrupted at frequency spacing $\Delta f_o$, they represent a frequency spectrum as shown in FIG. 2*b*. A discriminator 16 is provided which compares the oscillations 18 with the oscillations of oscillator 7 and again produces a control voltage $U_R$ which controls the oscillator 7, depending on its tuning, to one of frequencies $f_o$. When the oscillator is fully tuned, it also locks on one of frequencies $f_o$ as shown in FIG. 2*b*.

Figure 6:
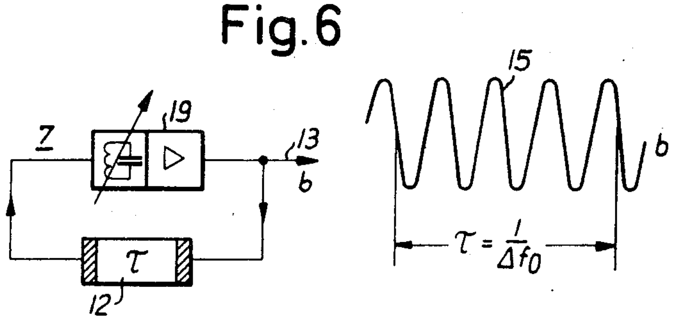

According to the embodiment of FIG. 6, instead of controlling an oscillator by means of pulses at a desired frequency, the oscillator 7 is formed by a tunable selective amplifier 19 between whose output and input the delay line 12 is disposed. The delay line 12 thus forms a feedback path for amplifier 19 thus providing the required phase shift so that the amplifier 19 and acts as an oscillator. The feedback condition for the generated oscillation 15 is met only when the frequency of the oscillation is a multiple of the value $1/\tau$ of the delay line 12. The oscillator 7 formed by delay line 12 and amplifier 19 can thus oscillate only at frequencies which are whole number multiples of $\Delta f_o$, so that the spectrum according to FIG. 2*b* is again assured. The particular multiple of $\Delta f_o$ at which the oscillator 7 oscillates is determined by the tuning of amplifier 19 which is again in synchronism with the transmitter tuning according to FIG. 1.

Figure 7:
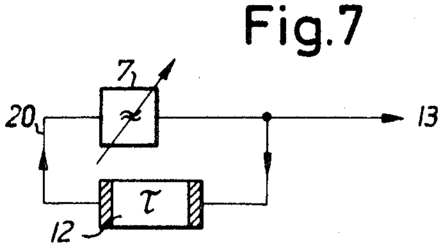

In FIG. 7, which is a modification of FIG. 6, the delay line 12 is disposed between the output and an input of an oscillator 7 and serves to synchronize the locking thereof. Oscillator 7, without delay line 12, is self-oscillating and would thus, as is conventional, continuously change its frequency during tuning. With the locking synchronization provided via delay line 12 and line 20 it is assured that the oscillator 7 can oscillate only when the voltage across line 20 effects a synchronization with the phase of the generated voltage. This again is the case only, as in FIG. 6, at certain frequencies given by the delay time and disposed at a spacing $1/\tau$. During tuning the oscillator 7 thus again oscillates only at these frequencies according to FIG. 2*b*.

Figure 8:
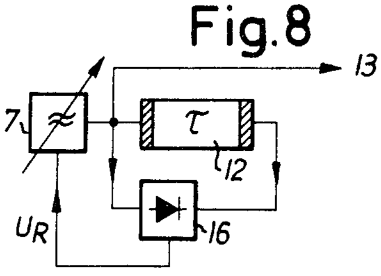

In the embodiment of FIG. 8 the output voltage of the tunable oscillator 7 is fed to the input of delay line 12 and the input voltage and output voltage of the delay line 12 are fed to the phase comparison stage 16 whose output control voltage $U_R$ is again utilized to control the oscillator 7. The control voltage $U_R$ insures that the voltage at the input and output of the delay line 12 has a defined phase relationship, e.g., the same phase. However, the identical phase can be given only at certain frequencies of the output voltage of oscillator 7, i.e., whenever the delay time $\tau$ is a whole number multiple of the period duration of the frequency. Thus, oscillator 7 can oscillate only at frequencies which are offset with respect to one another by the spacing $\Delta f_o = 1/\tau$. Consequently, only certain frequencies according to FIG. 2b result again at terminal 13 during tuning.

Oscillator 7 may additionally be automatically frequency controlled by a known circuit (the so-called automatic fine tuning). This subsequent tuning voltage is generated, for example in a phase discriminator fed with the IF voltage and takes care that the intermediate frequency always has its rated value. In the circuit according to FIG. 1 this control circuit would insure, for example, that the intermediate frequency always falls exactly in the passing range of quartz filter 8.

It will be understood that the above description of the present invention is susceptible to various modifications, changes and adaptations, and the same are intended to be comprehended within the meaning and range of equivalents of the appended claims.

We claim:

1. In a radio receiver for the selective reception of single sideband signals ($f_s$) transmitted by a plurality of transmitters at equal frequency spacing ($\Delta f_s$) including a frequency selective amplifier for receiving the transmitted signals, a local oscillator, which is tunable in synchronism with said amplifier, for producing output signals having defined frequencies at a frequency spacing ($\Delta f_o$) equal to $n$ or $1/n$ times the frequency spacing ($\Delta f_s$) of the transmitter frequencies, where $n$ is a whole number (1, 2, 3 . . .) and means for combining the received signal and the output signal from said local oscillator to detect the received signal, the improvement comprising: means, including an ultrasonic delay line whose delay time ($\tau$) is equal to the reciprocal value of the spacing of the oscillator frequencies ($\Delta f_o$) and which serves as the frequency standard for the spacing of the local oscillator frequencies ($\Delta f_o$), for controlling the frequency of said local oscillator so that it locks in and oscillates at only said defined frequencies.

2. The radio receiver as defined in claim 1 wherein said means for controlling the frequency of said local oscillator comprises: a generator means for producing an output pulse train having a frequency which is equal to the spacing of the oscillator frequencies ($\Delta f_o$), said ultrasonic delay line being the frequency determining member of said pulse generator; and means for coupling said output pulse train to a frequency controlling input of said local oscillator.

3. The radio receiver as defined in claim 2 wherein said coupling means comprises means for directly feeding said pulse train to said local oscillator to synchronize said local oscillator to the selected oscillator frequency by a direct locking action.

4. The radio receiver as defined in claim 2 wherein said coupling means further includes a phase comparison means for comparing said pulse train and the output signal of said local oscillator and for producing an output voltage which is coupled to said local oscillator and acts as a control voltage on the frequency of said oscillator.

5. The radio receiver as defined in claim 2 wherein said coupling means includes means responsive to said pulse train for producing oscillations of the order of magnitude of a local oscillator frequency, which oscillations are interrupted at frequency intervals corresponding to said frequency spacing ($\Delta f_o$).

6. The radio receiver as defined in claim 5 wherein said means responsive to said pulse train comprises a start-stop oscillator which is actuated by each of the pulses of said pulse train to generate a number of oscillations at a local oscillator frequency.

7. The radio receiver as defined in claim 5 wherein said coupling means further includes a phase comparison means for comparing the phase of said interrupted oscillations and the output signal of said local oscillator and for providing an output voltage which is coupled to said local oscillator and serves as the control voltage ($U_R$) for controlling the frequency of said local oscillator.

8. The radio receiver as defined in claim 1 wherein said means for controlling the frequency of said local oscillator comprises said ultrasonic delay line which is disposed in the feedback path of said local oscillator.

9. The radio receiver as defined in claim 1 wherein said means for controlling the frequency of said local oscillator comprises said ultrasonic delay line which is connected between the output and a synchronizing input of said local oscillator to provide direct locking synchronization thereof.

10. The radio receiver as defined in claim 1 wherein said ultrasonic delay line has its input connected to the output of said local oscillator and wherein said means for controlling the frequency of said local oscillator further includes means for comparing the phase of the input and output signals of said ultrasonic delay line to provide an output voltage which is coupled to said local oscillator and serves to control the frequency thereof.

11. The radio receiver as defined in claim 1 wherein said ultrasonic delay line is a PAL delay line with a delay time ($\tau$) which is adapted to the frequency spacing ($\Delta f_o$) of the oscillator frequencies ($f_o$).

* * * * *